March 10, 1959     J. SWARBRICK     2,876,570
DISPLAY SIGN WITH ROTARY PATTERN MOVEMENT
Filed Dec. 20, 1954     7 Sheets-Sheet 5

Fig. 5.

INVENTOR.
John Swarbrick
BY
Att'y.

Fig. 6.

INVENTOR.
John Swarbrick

March 10, 1959  J. SWARBRICK  2,876,570
DISPLAY SIGN WITH ROTARY PATTERN MOVEMENT
Filed Dec. 20, 1954  7 Sheets-Sheet 7

INVENTOR.
John Swarbrick

United States Patent Office 2,876,570
Patented Mar. 10, 1959

2,876,570

DISPLAY SIGN WITH ROTARY PATTERN MOVEMENT

John Swarbrick, Nokomis, Ill.

Application December 20, 1954, Serial No. 476,400

7 Claims. (Cl. 40—137)

This invention relates to display signs of the type which provide an optical illusion of movement to a design or object on the sign as the observer moves in a direction transversely of the sign.

Display signs of this type usually comprise a pair of mutually spaced panels, one of which is provided with a series of spaced parallel lines over a substantial area thereof, the other of the panels having a design formed of spaced lines and depicting an object or pattern. A first of these panels is located between the second panel and the point of observation of the sign, the front panel having transparent spaces between the lines thereof so as to permit light rays from the rear panel to be transmitted through the transparent spaces to the point of observation. The projections of the lines of the rear panel to said point of observation intersect the lines on the front panel so that the observer will see a plurality of dark moire areas in a predetermined spaced relation or pattern in said design area. These dark moire areas result from the apparent intersection of the lines of the front panel with respect to those of the rear panel as viewed by the observer. The lines are so arranged that as the observer moves in a direction transversely of the sign, these dark moire areas will appear to move so as to impart an optical illusion of movement to the object or pattern displayed on the sign.

This type of display sign is disclosed in my prior U. S. Patent No. 2,482,947, issued September 27, 1949. The present invention involves several improvements over the display sign as disclosed in said prior patent.

It is an object of the present invention to provide a display sign of the character described wherein the design area containing the moires is arranged in a substantially continuous curvilinear path, preferably in the form of a continuous circle or an ellipse, so as to provide a more realistic and striking depiction of rotary motion of a circular object or pattern.

Another object of the present invention is to provide a display sign of the character described wherein the design area and the lines thereof are so arranged as to depict an automobile tire as viewed in perspective. The lines of each panel are so constructed and arranged with respect to each other and with respect to the lines of the other panels that the dark moires seen by the observer will depict the treads of the automobile tire, as well as other parts thereof if so desired. As the observer moves transversely of the sign, the moires depicting the treads will move so as to give the impression that the tire is rotating.

A further object is to provide that the movement and spacing of the tread depicting moires be greater in the middle regions of the tire than in the top and the bottom portions of the tire, thereby providing a more realistic illusion of a rotating tire viewed in perspective.

Still another object is to provide that the tread depicting moires be arranged in a series of parallel continuous bands or sections, the spaced lines of each section on the design panel being offset from the lines of the adjacent sections a distance equal to one-half of the spacing between the spaced lines, whereby the dark moires of each section will be located in alignment with the spaces between the moires of the sections adjacent thereto. This will give the tread depicting moires a staggered arrangement and thereby make the tread pattern of moires more realistic in appearance.

A further object of the invention is to provide a modification of the invention wherein the design area is in the form of a continuous circle.

Still another object is to provide that the moires in the circular design area extend throughout the latter in a direction approximately radially with respect to the center of said continuous circle.

Another object is to provide several novel arrangements, constructions, shapes and spacings for the spaced lines on the design panel so that the desired patterns and movements of the dark moires may be obtained, as for example: The lines of the design panel are divided into a plurality of different groups, one of said groups having a different line spacing, that is, a different number of lines per unit area, than the other groups. The lines of each panel may be inclined with respect to the lines of the other panel. The lines of one of said groups may be inclined with respect to the lines of another of said groups, and the lines of each group may extend angularly with respect to the lines of the same group. The angularly extending lines of each group may converge toward a common point. The lines of one or more of said groups may be non-rectilinear and curved in a predetermined manner.

Other objects and advantages of the present invention are inherent in the structure as claimed and disclosed, or will become apparent as the detailed description proceeds in connection with the accompanying drawings wherein:

Figure 1:
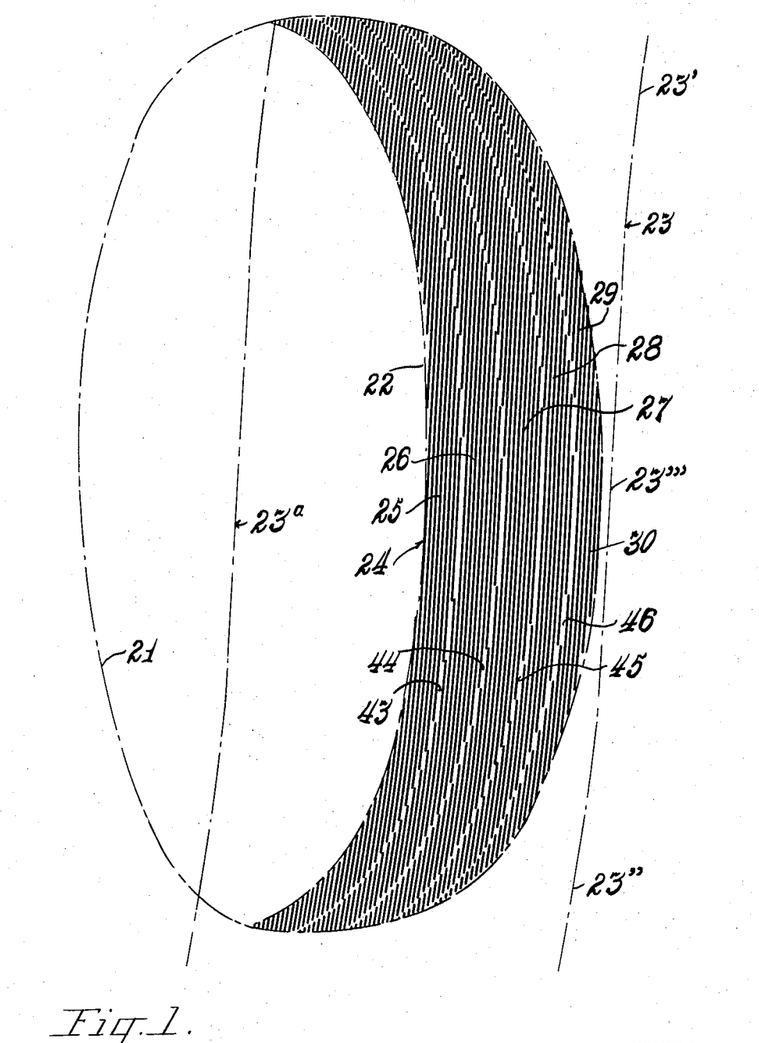
Fig. 1 shows the spaced lines of the design panel which form the bottom surface of the tire tread and the mode of construction of those lines.

Referring to the drawing in more detail, and in particular to Figure 1, the elliptical dash-dot line 21 indicates the outline of an automobile tire to be shown in perspective on one of the two spaced panels forming the sign. The semi-elliptical dash-dot line 22 defines the edge of the treaded bottom surface 24 of the tire. The treaded area 24 between line 22 and the right-hand side of the outline 21 is provided with a plurality of groups or sections 25 to 29 of spaced parallel lines 30 which are constructed in the following manner.

The reference numeral 23 indicates a dash-dot generator line which is moved rectilinearly to the left, as viewed in Figure 1, in spaced predetermined increments. At each position of the generator line 23, one or two of the spaced lines 30 forming the tire tread section on the design panel are drawn coincident with the generator line 23. It will be noted that the latter is of somewhat S-shaped configuration and extends arcuately to the right at its upper portion 23′ and arcuately to the left at its lower portion 23″. The intermediate portion 23‴ of the generator line 23 is straight and preferably extends at an inclination to the vertical of approximately 3½ degrees to the right. The treaded area 24 is divided into five contiguous sections 25 to 29 respectively. As the generator line 23 is moved to the left in successive increments across the treaded section 29, a series of spaced parallel lines 30 are drawn coincident with the generator line 23 throughout the area of the section 29. After the spaced lines 30 of section 29 are drawn, the generator line 23 is then indexed or offset a distance equal to one-half the spacing distance between the lines 30, and the next adjacent section 28 is then similarly provided with spaced parallel lines 30 drawn coincident with the generator line 23. Then the latter is again indexed or offset a distance equal to one-half of the spacing distance between the lines 30 and the next tread section 27 is then drawn with spaced lines 30, after which the sections 26 and 25 are successively drawn in a similar manner with an indexing or offsetting of the generator line 23 between each of said sections. The design panel will then have the appearance shown in Figure 1, the final position of the generator line 23 being shown at 23a. The spaced lines 30 of each of the sections 25 to 29 are preferably spaced from each other such a distance that there will be 22.35 lines per inch in the direction of rectilinear movement of the generator line 23. This spacing is selected in accordance with the spacing of the lines on the other panel shown in Figure 5, the distance between the two panels, the distance of the observer from the sign, and the number of the dark moires and the desired speed of movement of the latter, as will be explained in more detail below.

Figure 2:
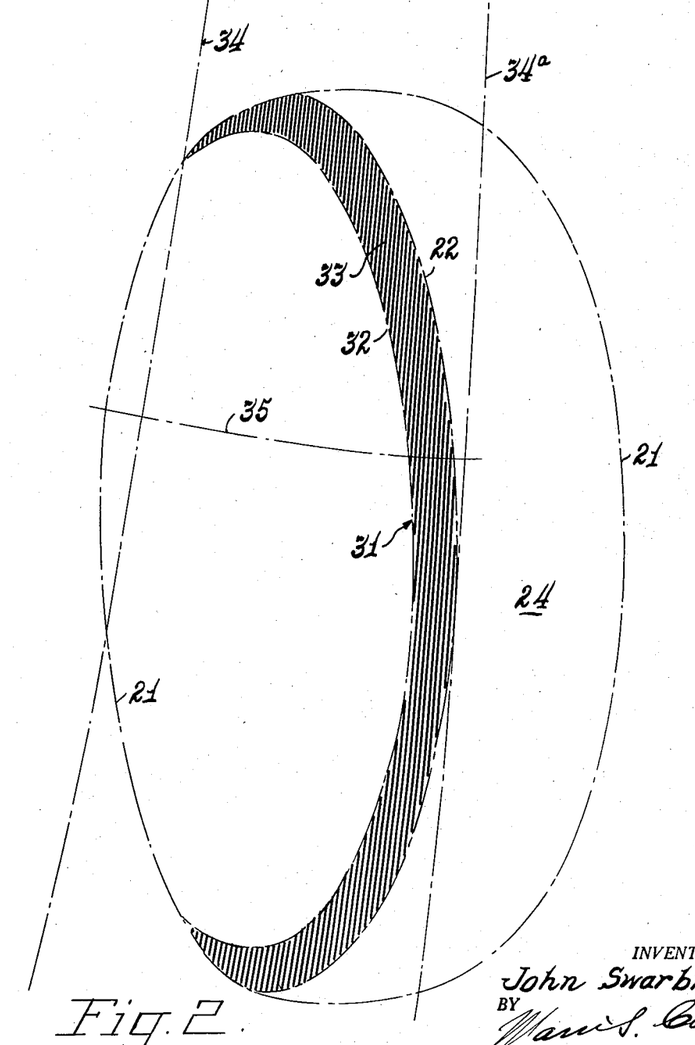
Fig. 2 shows the spaced lines of the design panel which depict the peripheral treaded portion of the tire side wall along the forward half of the tire to be shown in perspective.

The next step in the construction of the spaced lines for the design panel is shown in Figure 2 wherein the reference numerals 21 and 22 indicate the dash-dot tire outlines described above with respect to Figure 1. In Figure 2, there is shown the construction for the spaced lines forming the peripheral treaded area 31 of the side wall of the tire. The area 31 is defined by the semi-elliptical dash-dot outline 22 and another semi-elliptical dash-dot outline extending approximately parallel thereto and indicated by the reference numeral 32. For drawing the spaced lines 33 of area 31, there is provided a generator line indicated in dash-dot at 34. The latter is not moved rectilinearly as is the generator line 23 of Figure 1, but instead is rotated about an axis located approximately 27½ inches above the top edge of the elliptical dash-dot outline 21, the generator line 34 swinging from its initial left-hand position across the area 31 to its final right-hand position indicated at 34a. The generator line 34 is moved in successive spaced increments so that the spacing distance between the spaced lines 33 along the arcuate dash-dot line 35 is preferably about 22.35 lines per inch, there being approximately 25 lines per inch at the uppermost portion of area 31 and approximately 19 lines per inch along the lowermost portion thereof. At each successive position of generator line 34, one or more of the spaced lines 33 will be drawn coincident therewith until the entire area 31 takes on the appearance shown in Figure 2. The initial left-hand position of generator line 34 is inclined approximately 9½ degrees with respect to the vertical and the final position indicated at 34a is approximately 3¾ degrees with respect to the vertical. It will be noted that the generator line 34 is curved, its concave side facing to the left as viewed in Figure 2. The reason for this curvature and other features in the above-described mode of construction of the spaced lines 33 will become apparent as the description proceeds.

Figure 3:
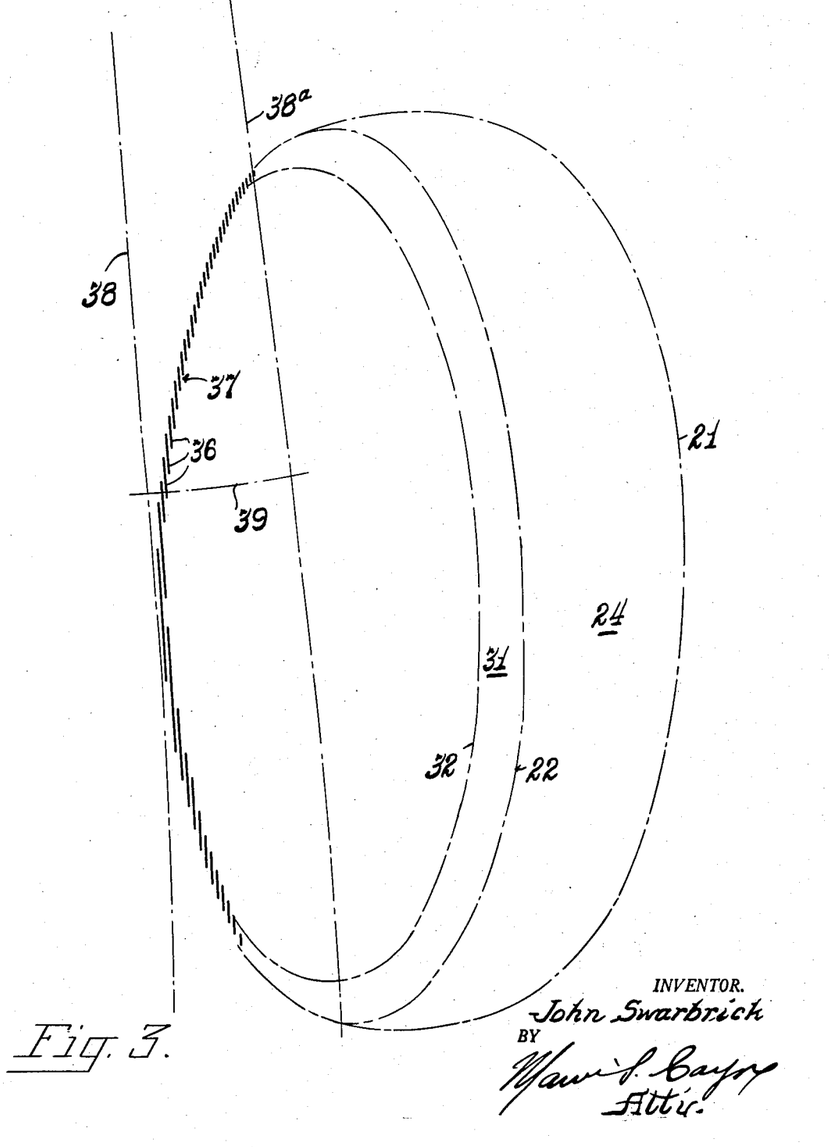
Fig. 3 shows the spaced lines depicting the rear half of the peripheral treaded portion of the tire side wall.

Referring now to Figure 3, there is shown the mode of construction of the spaced lines 36 in the area 37 depicting the rear half of the peripheral treaded surface of the tire side wall, the area 37 being continuous with the area 31 described above with respect to Figure 2. For drawing the lines 36, there is provided a generator line 38 which, similar to the generator line 34 of Figure 2, is rotated about a center located approximately 27½ inches vertically above the top edge of the elliptical dash-dot outline 21, the generator line 38 swinging from its initial left-hand position shown to its final right-hand position indicated at 38a. The generator line 38 is rotated in successive spaced increments to provide 22.35 lines per inch along the arcuate dash-dot line indicated at 39, it being understood that there will be a greater number of lines per inch above line 39 and a wider spacing or a lesser number of lines per inch below line 39. The generator line 38 is curved substantially throughout its entire length so as to be concave toward the left as viewed in Figure 3. At its initial left-hand position the generator line 38 extends at an angle of approximately 4½ degrees with respect to the vertical, whereas in its right-hand position 38a it will be approximately 8 degrees with respect to the vertical. It will be obvious that since the spaced lines 36 of section 37 are drawn by means of and coincident with the generator line 38, the spaced lines 36 will have the same curvature and angular inclination as the respective portions of the generator lines 38 with which they are coincident. The area 37 is of relatively narrow width and extends along the left-hand portion of the elliptical dash-dot outline 21. The upper and lower ends of section 37 are continuous with the corresponding ends of section 31.

Figure 4:
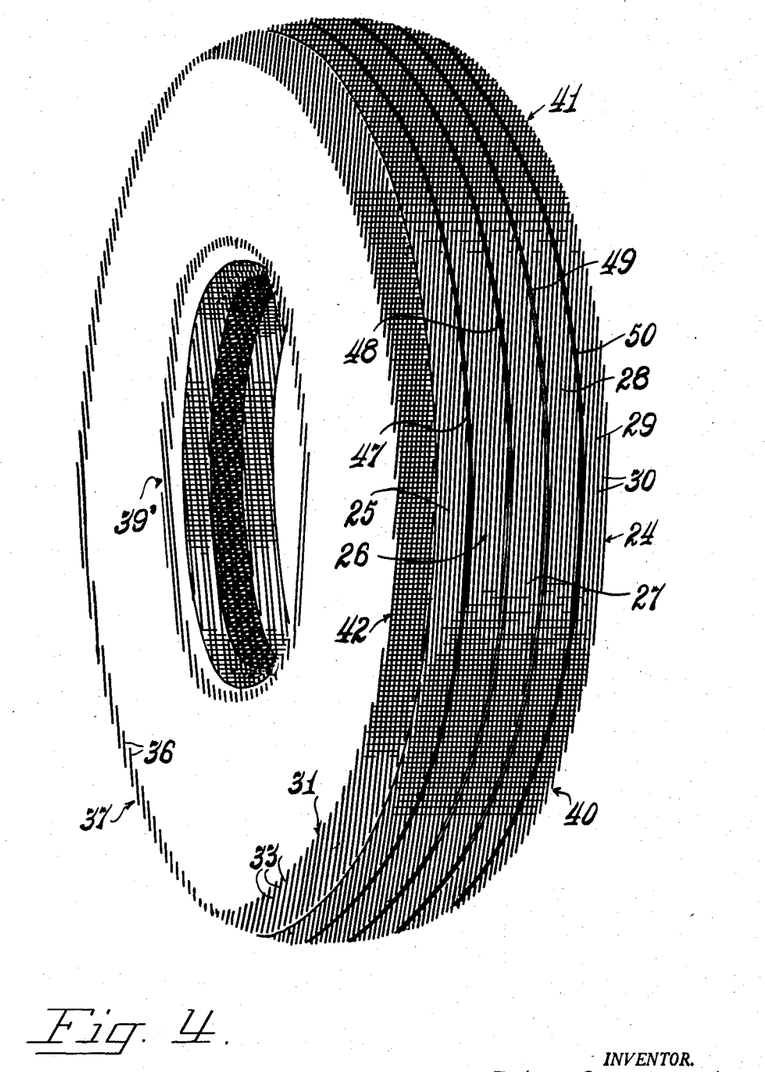
Fig. 4 shows the spaced lines of Figures 1 to 3 combined to form the design panel, together with other lines depicting shading and the inner opening of the tire.

Referring now to Figure 4, there is shown the completed arrangement of lines on the design panel obtained by combining the spaced lines of areas 24, 31 and 37 of Figures 1 to 3 respectively, together with additional lines for shading and other lines for depicting the inner peripheral tire opening. The lines depicting the inner peripheral opening of the tire are indicated generally by the reference numeral 39′ and need not be further described since they may be constructed in accordance with the same techniques described above with respect to Figures 1 to 3. The sections 25 to 29 inclusive of the tire treaded surface 24 are provided with a series of spaced horizontal shade lines at the lower intermediate portion of area 24, as indicated by the reference numeral 40. The uppermost portion of the tread area 24 is similarly provided with a series of spaced horizontal shade lines 41. The treaded peripheral edge area 31 of the tire side wall is provided throughout its intermediate portion with spaced horizontal shade lines indicated at 42.

Figure 6:
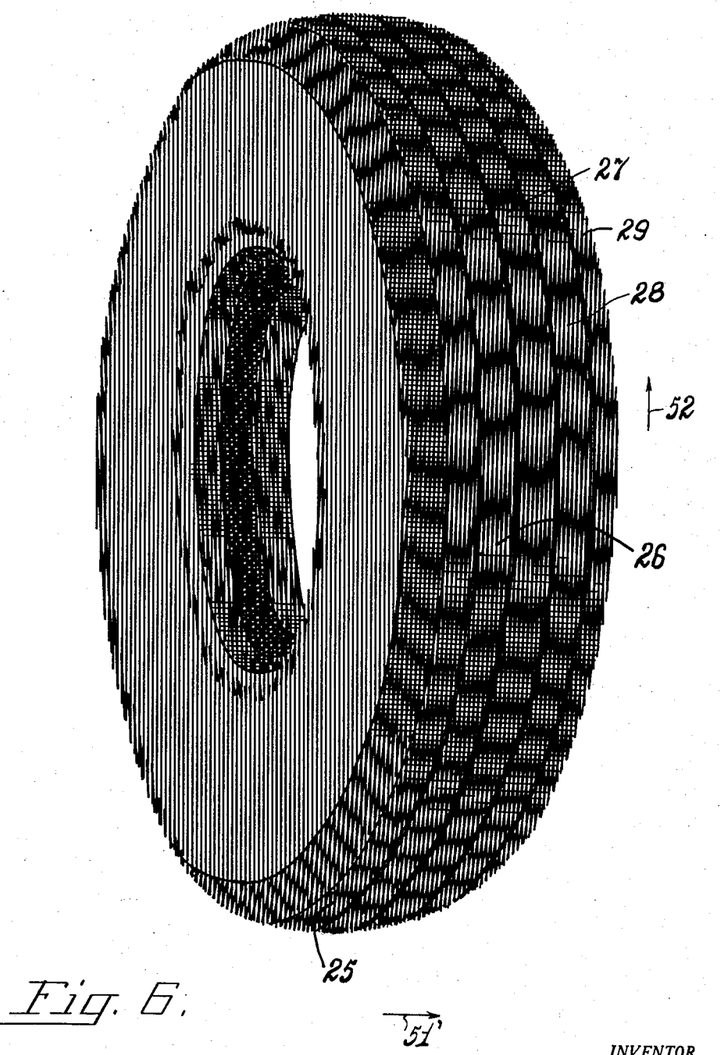
Fig. 6 shows the appearance of the complete sign to the observer resulting from the combined effect of the design panel of Figure 4 with the other panel of Figure 5.

The shade lines 40, 41 and 42 do not cooperate with the lines of the other panel to form any dark moires, but instead merely provide shading to increase the impression of roundness of the tire as it appears to the observer in the completed sign shown in Figure 6.

It will be recalled that the spaced lines 30 of each of the tread sections 25 to 29 are spaced or offset a distance, equal to one-half the line spacing distance, from the lines 30 of the adjacent sections 25 to 29. There are thus provided, as shown in Figure 1, four narrow arcuate blank areas between the adjacent tread sections 25 to 29, as indicated by the reference numerals 43, 44, 45, and 46 in Figure 1. As shown in Figure 4, heavy arcuate lines 47 to 50 inclusive are drawn in the respective blank areas 43 to 46. The lines 47 to 50 give the appearance of peripheral grooves in the completed sign so as to provide a more realistic appearance to the tire.

Figure 5:
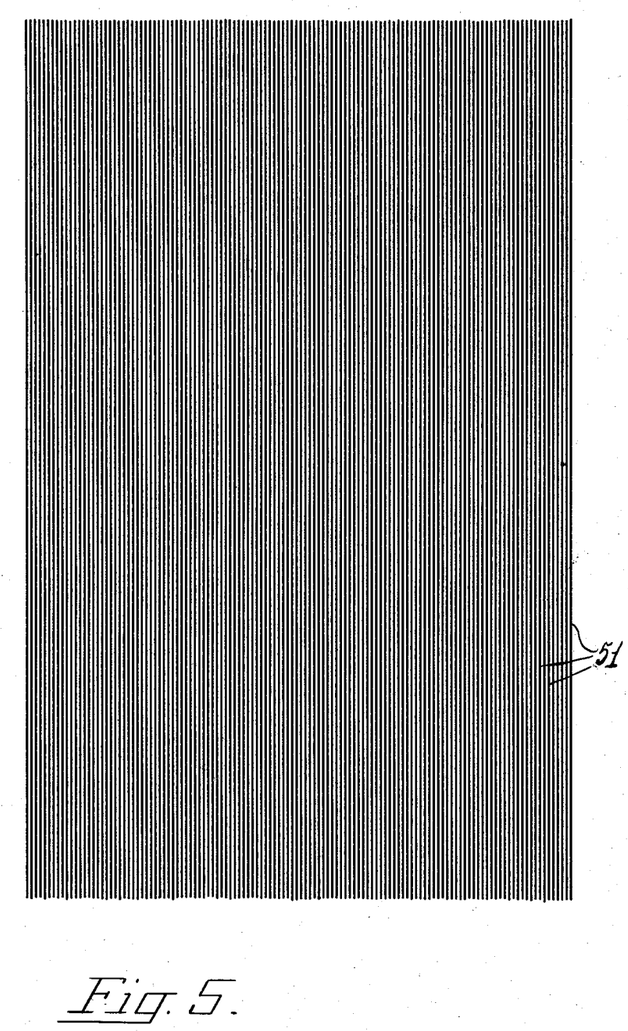
Fig. 5 shows the spaced parallel lines on the other panel to be used in combination with the design panel shown in Figure 4.

Referring now to Figure 5, there is shown the series of spaced parallel lines to be formed on the other panel which is to be used in conjunction with the design panel shown in Figure 4. The lines 51 shown in Figure 5 are preferably vertical, rectilinear and uniformly spaced. However, it is to be understood that the lines 51 may extend horizontally or at an inclination, or may be curved, or may have a non-uniform spacing, if so desired, provided that the lines on the design panel shown on Figure 4 be modified accordingly. The lines 51 are spaced so as to provide approximately 22.5 lines per inch in the drawing. However, in the actual physical embodiment of the sign the lines 51 would be spaced so as to provide 22 lines per inch. Due to the effect of perspective created by the fact that the rear panel is spaced behind the front panel, the lines 51 in the actual sign embodiment have the appearance of comprising 22.5 lines per inch and therefore this latter spacing has been employed in the drawing. This spacing of 22 lines per inch is proper if the panel of Figure 5 is to be located to the rear of the design panel of Figure 4 with a spacing of 2⅝ inches between the panels and the observer is at a distance of approximately 10 feet. If the panel of Figure 5 is placed in front of the design panel of Figure 4, or if the spacing between the panels is other than 2⅝ inches, or if the display sign is to be designed for an approximate observer-distance of substantially more or less than 10 feet, then the spacing of the lines 51 of the panel of Figure 5 must be varied in accordance with the principles explained below.

Referring to Figure 6, there is shown the appearance to the observer of the assembled sign with the panel of Figure 5 located 2⅝ inches rearwardly of the design panel of Figure 4 and with the observer approximately 10 feet from the sign. It will be obvious that in this preferred arrangement of the panels, the spaces between the lines of the design panel of Figure 4 must be open or transparent so as to enable the lines 51 of the rear panel of Figure 5 to show through. The projections of the lines 51 of the rear panel to the point of observation will apparently intersect with the lines 30 of the design panel so as to provide in each of the tread sections 25 to 29 a series of horizontally extending dark areas or moires. It will be seen that the moires of each of the sections 25 to 29 are staggered with respect to the moires of the sections adjacent thereto. That is, each moire of a particular section is located adjacent and in alignment with a space between moires of the section adjacent thereto. This is due to the fact that the generator line 23 of Figure 1 was offset or indexed one-half the distance of the spacing between lines 30 so that the lines 30 of each section 25 to 29 are offset one-half spacing with respect to the lines 30 of the sections adjacent thereto. Displacement of the spaced lines 30 a distance of half a line space results in displacement of the resultant moires a distance of half a moire space, thereby providing the staggered moire effect shown in Figure 6.

It will be seen that the moires in the intermediate portion of tire tread area 24 are spaced apart from each other a greater distance than are the more closely spaced moires in the upper and lower portions of area 24. Furthermore, as the observer moves in a direction transversely of the sign, as indicated by the arrow 51', that is, approximately parallel to the sign or in some direction having a vector component parallel to the sign, the moires in tread area 24 will move in spaced succession along area 24 so as to provide the optical illusion that the tire is rotating. The more closely spaced moires at the upper and lower portions of area 24 will move more slowly than the more widely spaced moires in the intermediate portion of said area 24. The combined effect of the greater spacing of the moires and the slower movement thereof in the intermediate portion of the area 24, that is, the portion of said area 24 which in perspective appears to be nearer to the observer, provides a realistic optical impression in accordance with the laws of perspective.

This differential in spacing and rate of movement of the moires of tread area 24 is obtained in the following manner. It will be recalled in the description of the mode of construction of the spaced lines 30 as shown in Figure 1 that the generator line 23 is of approximately S-shape in configuration so that the intermediate portion of the generator line 23 is at a lesser inclination to the vertical than are the curved upper and lower portions 23', 23'' thereof. Therefore, the spaced lines 30 in the upper and lower portions of sections 25 to 29 of tread area 24 will be at a greater inclination than the lines 30 in the intermediate portions. Since the lines 51 of the other panel shown in Figure 5 are vertical, the spaced lines 30 of the design panel at the upper and lower portions of tread area 24 are at a greater inclination with respect to lines 51 of the other panel than are the spaced lines 30 at the intermediate portion of tread area 24. The greater the angularity between the lines of one panel with respect to the lines of the other panel, the closer will be the moires formed and the slower will be the movement of the moires as the observer moves transversely of the sign.

More specifically, if the observer moves a distance so as to effect an apparent relative movement of the panels a distance of one line spacing, that is, the projection of each line on the rear panel to the point of observation intersects a respective front panel line which is adjacent to and one line space away from the original line intersected before movement of the observer, then each moire will move a distance of one moire space. Therefore, if the moires are close together, a given movement of the observer will provide slower moire movement than is the case where the moires are farther apart.

The same principles are applicable to the moires of the treaded side wall peripheral area 31 of Figure 2. As seen in Figure 6, the moires in area 31 are spaced closer together in the upper and lower portions of the tire than in the intermediate portion thereof, and will also move slower in the upper and lower portions, in accordance with the laws of perspective. This effect is obtained by the curved shape and angular inclination of generator line 34, as is also the radial orientation of the moires in area 31. It will be seen that the moires appear to be radial with respect to the tire axis, as viewed in perspective, thereby further enhancing the realistic effect.

As viewed in Figure 6, movement of the observer to the right, as indicated by the arrow 51', will cause the moires in tread area 24 and peripheral side wall area 31 to move upwardly in the direction of arrow 52 while the moires in the rear peripheral side wall area 37 will move downwardly. If the observer moves to the left, then the moires will move oppositely to that described above so that the tire will appear to rotate in the opposite direction.

A particular pattern of moires and the desired movement of the moires may be obtained by proper arrangement of the spaced lines in accordance with several other principles, in addition to those described above. The number of moires is equal to the difference in the "effective" line spacing of the two panels in lines per inch. The "effective" line spacing of both panels is measured along the same direction so that if one panel is at an angle to the other, moires will appear even though both panels have actually the same line spacing.

The effect of perspective must be taken into account. Since the front panel is closer to the observer than the rear panel, the front panel will have an effective number of lines per inch less than the actual number, and this perspective effect increases as the panels are spaced farther apart and as the point of observation approaches the sign.

Another principle involved in determining the spacing and configuration of the lines is that when the front panel has less lines per inch than the rear panel, movement of the moires is in the same direction as the observer, and vice versa. In order to reverse the direction of movement of the moires for a particular direction of movement of the observer, it is usually merely necessary to decrease or increase the line spacing of one of the panels so as to provide that the front panel have more lines per inch than the rear panel.

Figure 7:
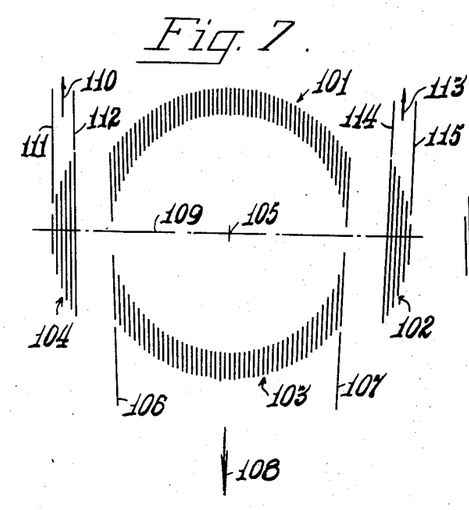
Fig. 7 shows the mode of construction of the several sections which are combined together to form a circular design area for a modified form of the present invention.

Referring now to Figures 7 to 10 inclusive, there is shown a modified form of the invention wherein the moire design area is in the shape of a circle rather than an elliptical tire as in Figures 1 to 6 inclusive, described above. Referring first to Figure 7, the circular design area on the design panel is formed by combining four groups or sections of spaced lines, the sections being designated by the reference numerals 101, 102, 103 and 104 respectively. The sections are shown separate from each other in Figure 7 so as to make clear the mode of construction of the lines thereof, the true relationship of the sections 101 to 104 in the final completed design panel being shown in Figure 8.

The spaced lines of the lower section 103 extend angularly with respect to each other so as to converge toward a common point located approximately 17½ inches from the center 105 of the circular pattern. This common point can be located at the intersection obtained by extending downwardly the radial lines indicated at 106, 107 and the arrow 108. In view of the fact that the lines of section 103 increase in angularity with respect to the vertical, and therefore with respect to the vertical spaced lines of the other panel shown in Figure 9, it is necessary to provide that the spaced lines of section 103 be spaced farther apart towards the opposite ends of said section. This is because the greater the angularity of the spaced lines of one panel with respect to the lines of the other panel, the greater the number of dark moires will be formed and the closer the moires will be spaced to each other. In order to counteract this effect due to change in angularity and thereby provide equal spacing of the moires around the circle, the spacing of the lines of section 103 must be increased towards the end portions of said section in accordance with the increasing angularity of the lines at said end portion.

The upper section 101 is similarly provided with spaced lines which converge toward the same common point as the lines of the lower section 103. For the same reasons noted above with respect to lower section 103, the lines of section 101 must be spaced farther apart at the end portions of section 101 than in the intermediate portion thereof so as to provide for uniform spacing of the dark moires.

Figure 9:
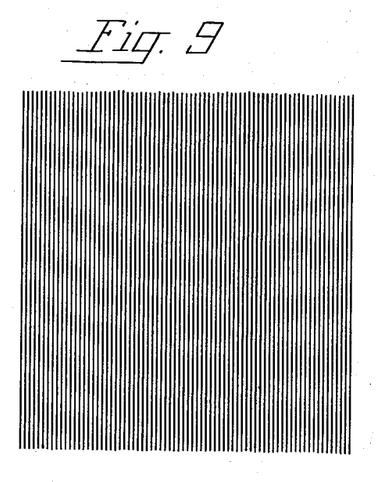
Fig. 9 shows the other panel to be combined with the panel having the circular design area of Figure 8.

It should be noted that one of the sections 101, 103 will have a greater number of lines per unit area than the lines of the other panel shown in Figure 9, and the other of said sections 101 and 103 must have a lesser number of lines per unit area than said other panel. This is so because if the design panel has a greater number of lines per unit area than the other panel, the dark moires will move in a particular direction as the observer moves transversely of the sign, whereas if the design panel has a lesser number of lines than the other panel then the dark moires will move in the opposite direction as the observer moves in the same direction transversely of the sign. Therefore, in order to impart an optical illusion of rotary movement to the moires, it is necessary to have the moires of section 101 move in the opposite direction with respect to the movement of the moires of section 103 and therefore one of said sections must have a greater number of lines per unit area than the other panel, whereas the other of said sections must have a lesser number of lines per unit area.

The lines of the left-hand section 104 extend angularly with respect to each other so as to converge toward a common point located approximately 17½ inches from the dash-dot diametral line 109 in the direction of the arrow 110, this common point being at the intersection of extensions of the radial lines 111, 112. The right-hand section 102 is similarly constructed, the lines thereof converging toward a common point located 17½ inches from the dash-dot diametral line 109 in the direction of arrow 113 at the intersection of extensions of the radial lines 114, 115.

Figure 8:
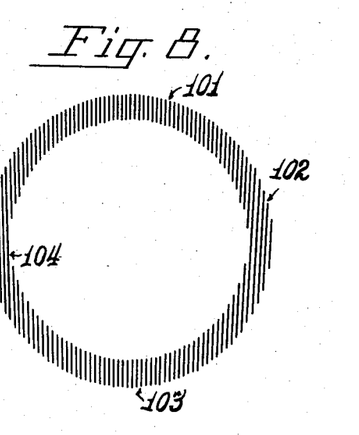
Fig. 8 shows the circular design area of the modification of Fig. 7.

As the design panel is actually constructed, the four sections 101, 102, 103 and 104 are arranged in continuous assembled relationship to form the circular design area shown in Figure 8. The design panel thus formed is spaced a predetermined distance from the other panel shown in Figure 9, this distance being dependent upon the usual distance of observers from the sign and the relative line spacing of the lines of the two panels. Either of the panels may be placed in the forward position so as to be nearest the point of observation, but it is preferred that the design panel of Figure 8 be so located. Whichever panel is closer the point of observation, the front panel will have the spaces between its lines blank or transparent so as to permit the lines of the rear panel to be viewed therethrough.

Figure 10:
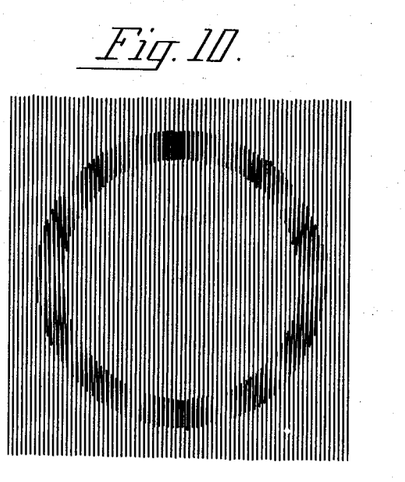
Fig. 10 shows the appearance to the observer of the circular display sign formed by combining the panels of Figures 8 and 9.

When the design panel of Figure 8 and the other panel of Figure 9 are combined together at the proper spacing and are viewed by an observer at approximately the intended point of observation, the observer will see a circular series of dark moires as shown in Figure 10. As the observer moves transversely of the sign, the dark moires will appear to rotate in spaced succession around the circular design area and thereby impart an optical illusion of rotary movement to the annular member or other object or pattern intended to be depicted by the sign. Movement of the observer transversely of the sign in the opposite direction will cause the dark moires to rotate in the opposite direction than was obtained when the observer was moving in said first direction. It will also be noted that the dark moires extend approximately radially toward the center of the circular design area and remain equally spaced from each other as they rotate in a circle around said design area.

The various lines shown in the figures of the drawing are drawn to substantially correct scale for a spacing between panels of 2⅝ inches and an observer-distance of about 10 feet. For other panel spacings and observer-distances, or other moire patterns, the arrangement of the lines may be varied in accordance with the principles disclosed, as will be obvious to those skilled in the art after study of the present disclosure.

It is to be understood that the specific embodiments shown in the drawing and described above are merely illustrative of several of the many forms which the invention may take in practice without departing from the scope thereof as delineated in the appended claims, and that the claims are to be construed as broadly as possible in view of the prior art.

Having described my invention, I claim as new and desire to secure by Letters Patent:

1. A display sign comprising a pair of mutually spaced parallel panels, one of said panels having a first series of spaced parallel lines over a substantial area thereof, the other of said panels having a curvilinear design area in the shape of the projection on a plane of a circular object, said other panel having a second series of spaced lines in said design area thereof, a first of said panels being located between the second panel and a point of observation of the sign, said first panel having transparent spaces between the lines thereof to permit light rays from the second panel to be transmitted through said transparent spaces to said point of observation, the optical projections of the lines of said second panel to said point of observation intersecting the lines on the first panel to provide a plurality of dark moires in spaced relation to each other in said curvilinear design area, said second series of lines being curved and extending in the intermediate portion of said design area at angles to said first series of lines and extending in the opposite end portions of said design area at angles to said first series of lines greater than said first recited angles, whereby said moires in said intermediate design area portion are spaced wider apart than the moires in said end portions and whereby relative movement of the point of observation and one or both panels will cause movement of said moires in substantially continuous spaced succession across said curvilinear design area from one end portion thereof to the opposite end portion with the moires in said intermediate design area portion moving at a greater velocity than the moires in said end portions.

2. A display sign as recited in claim 1 wherein each of the lines of said second series has the shape of a segment of the same single imaginary curved generator line of approximately flattened S-shape in configuration.

3. A display sign comprising a pair of mutually spaced parallel panels, one of said panels having a first series of spaced parallel lines over a substantial area thereof, the other of said panels having a curvilinear design area in the shape of the projection on a plane of a circular object, said other panel having a second series of spaced lines in said design area thereof, a first of said panels being located between the second panel and a point of observation of the sign, said first panel having transparent spaces between the lines thereof to permit light rays from the second panel to be transmitted through said transparent spaces to said point of observation, the optical projections of the lines of said second panel to said point of observation intersecting the lines on the first panel to provide a plurality of dark moires in spaced relation to each other in said curvilinear design area, said second series of lines being arranged in a plurality of curvilinear elongated sections extending in approximately parallel contiguous side to side relation, the lines of each of said sections being offset a distance of one-half of the spacing between the lines from the lines of the sections adjacent thereto so as to provide that the moires of each section will be located in alignment with the spaces between the moires of the sections adjacent thereto.

4. A display sign comprising a pair of mutually spaced parallel panels, one of said panels having a first series of spaced parallel lines over a substantial area thereof, the other of said panels having a curvilinear design area in the shape of the projection on a plane of a circular object, said other panel having a second series of spaced lines in said design area thereof, a first of said panels being located between the second panel and a point of observation of the sign, said first panel having transparent spaces between the lines thereof to permit light rays from the second panel to be transmitted through said transparent spaces to said point of observation, the optical projections of the lines of said second panel to said point of observation intersecting the lines on the first panel to provide a plurality of dark moires in spaced relation to each other in said curvilinear design area, said second series of lines being curved and extending in the intermediate portion of said design area at angles to said first series of lines and extending in the opposite end portions of said design area at angles to said first series of lines greater than said first recited angles, whereby said moires in said intermediate design area portion are spaced wider apart than the moires in said end portions and whereby relative movement of the point of observation and one or both panels will cause movement of said moires in substantially continuous spaced succession across said curvilinear design area from one end portion thereof to the opposite end portion with the moires in said intermediate design area portion moving at a greater velocity than the moires in said end portions, said second series of lines being arranged in a plurality of curvilinear sections extending in approximately parallel contiguous relation, the lines of each of said sections being offset a distance of one-half of the spacing between the lines from the lines of the sections adjacent thereto so as to provide that the moires of each section will be located in alignment with the spaces between the moires of the adjacent sections.

5. A display sign comprising a pair of mutually spaced parallel panels, one of said panels having a first series of spaced parallel lines over a substantial area thereof, the other of said panels having a curvilinear design area in an elliptical shape corresponding to a perspective projection of a circular object, said other panel having a second series of spaced lines in said design area thereof, a first of said panels being located between the second panel and a point of observation of the sign, said first panel having transparent spaces between the lines thereof to permit light rays from the second panel to be transmitted through said transparent spaces to said point of observation, the optical projections of the lines of said second panel to said point of observation intersecting the lines on the first panel to provide a plurality of dark moires in spaced relation to each other in said curvilinear design area, each of the lines of said second series having the shape of a segment of the same single imaginary curved generator line of approximately flattened S-shape in configuration, said second series of lines extending in the intermediate portion of said design area at angles to said first series of lines and extending in the end portions of said design area at angles to said first series of lines greater than said first-recited angles, said second series of lines being arranged in a plurality of curvilinear sections extending in approximately parallel contiguous relation, the lines of each of said sections being offset a distance of one-half of the spacing between the lines from the lines of the sections adjacent thereto so as to provide that the moires of each section will be located in alignment with the spaces between the moires of the adjacent sections.

6. A display sign comprising a pair of mutually spaced parallel panels, one of said panels having a first series of spaced parallel lines over a substantial area thereof, the other of said panels having a curvilinear design area in the shape of the projection on a plane of a circular object, said other panel having a second series of spaced lines in a first portion of said design area thereof, a first of said panels being located between the second panel and a point of observation of the sign, said first panel having transparent spaces between the lines thereof to permit light rays from the second panel to be transmitted through said transparent spaces to said point of observation, the optical projections of the lines of said second panel to said point of observation intersecting the lines on the first panel to provide a plurality of dark moires in spaced relation to each other in said curvilinear design area, said second series of lines being curved and extending in the intermediate portion of said design area at angles to said first series of lines and extending in the opposite end portions of said design area at angles to said first series of lines greater than said first-recited angles, whereby said moires in said intermediate design area portion are spaced wider apart than the moires in said end portions and whereby relative movement of the point of observation and one or both panels will cause movement of said moires in substantially continuous spaced succession around said curvilinear design area with the moires in said intermediate design area portion moving at a greater velocity than the moires in said end portions, said other panel also having a third series of spaced lines in a second portion of said design area extending in approximately parallel contiguous relation to said first portion thereof, said lines of said third series being coincident with segments of an imaginary concave generator line in various positions of the latter as the generator line is rotated about a predetermined axis in spaced equal increments across said second portion, whereby the moires formed by said third series of lines extend angularly with respect to each other and converge toward a common point on the imaginary central axis of said circular object.

7. A display sign comprising a pair of mutually spaced parallel panels, one of said panels having a first series of spaced parallel lines over a substantial area thereof, the other of said panels having a curvilinear design area in the shape of the projection on a plane of a circular object, said other panel having a second series of spaced lines in a portion of said design area thereof, a first of said panels being located between the second panel and a point of observation of the sign, said first panel having transparent spaces between the lines thereof to permit light rays from the second panel to be transmitted through said transparent spaces to said point of observation, the optical projections of the lines of said second panel to said point of observation intersecting the lines on the first panel to provide a plurality of dark moires in spaced relation to each other in said curvilinear design area, said second series of lines being curved and extending in the intermediate portion of said design area at angles to said first series of lines and extending in the opposite end portions of said design area at angles to said first series of lines greater than said first-recited angles, whereby said moires in said intermediate design area portion are spaced wider apart than the moires in said end portions and whereby relative movement of the point of observation and one or both panels will cause movement of said moires in substantially continuous spaced succession around said curvilinear design area with the moires in said intermediate design area portion moving at a greater velocity than the moires in said end portions.

References Cited in the file of this patent
UNITED STATES PATENTS

| | | |
|---|---|---|
| 2,482,947 | Swarbrick | Sept. 27, 1949 |
| 2,624,142 | Sayre | Jan. 6, 1953 |